United States Patent [19]
Polaski

[11] 3,740,950
[45] June 26, 1973

[54] HYDROSTATIC TRANSMISSION WITH ACCELERATION CONTROL
[75] Inventor: David N. Polaski, Peru, Ill.
[73] Assignee: Sundstrand Corporation, Rockford, Ill.
[22] Filed: Sept. 14, 1971
[21] Appl. No.: 180,301

[52] U.S. Cl............... 60/459, 60/468, 137/115, 417/279
[51] Int. Cl............................................. F15b 15/18
[58] Field of Search............... 60/53 R, 53 A, 52 B, 60/459, 464, 468; 417/279; 137/115, 117

[56] References Cited
UNITED STATES PATENTS
| | | | |
|---|---|---|---|
| 3,402,549 | 9/1968 | Connett et al. | 60/19 |
| 3,543,515 | 12/1970 | Kempson | 60/52 VS |
| 3,672,168 | 6/1972 | Solmon | 60/53 R |

Primary Examiner—Edgar W. Geoghegan
Attorney—Hofgren, Wegner, Allen, Stellman & McCord

[57] ABSTRACT

A reversible hydrostatic transmission including a pump, a motor, conduits connecting the pump and motor in closed circuit, means for varying the displacement of the pump in opposite directions from neutral, and an acceleration and deceleration control including a pair of valves communicating respectively with the pressure and return conduits and biased to open positions providing a bypass passage between the conduits for limiting the rate of pressure buildup in either conduit on acceleration or deceleration, together with means responsive to pressure buildup in one conduit on acceleration for moving the associated valve to a position closing the bypass and terminating the limit on pressure buildup.

8 Claims, 2 Drawing Figures

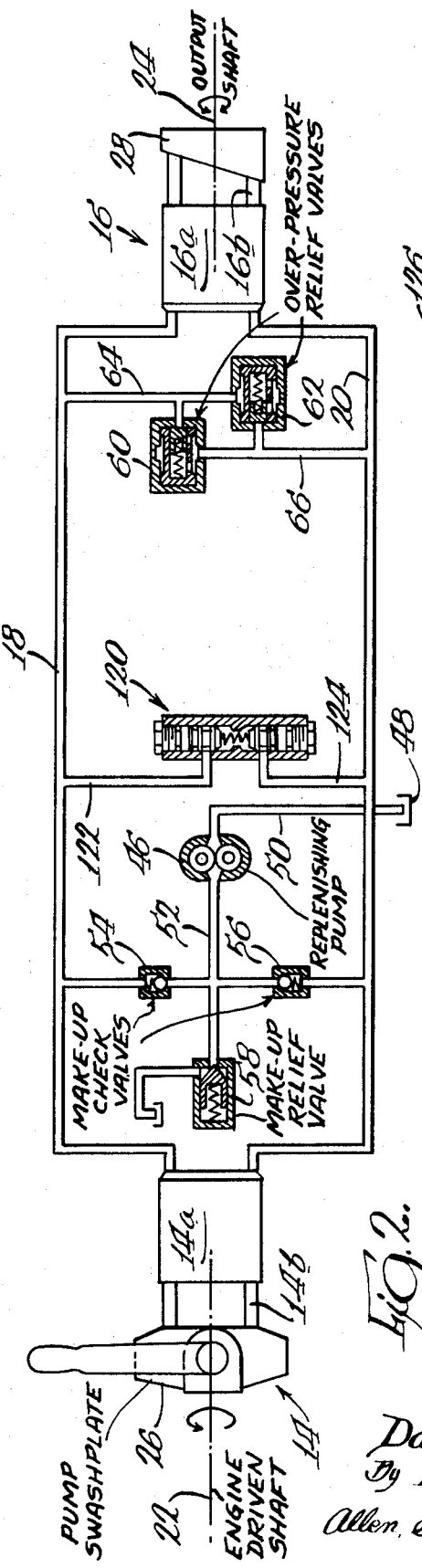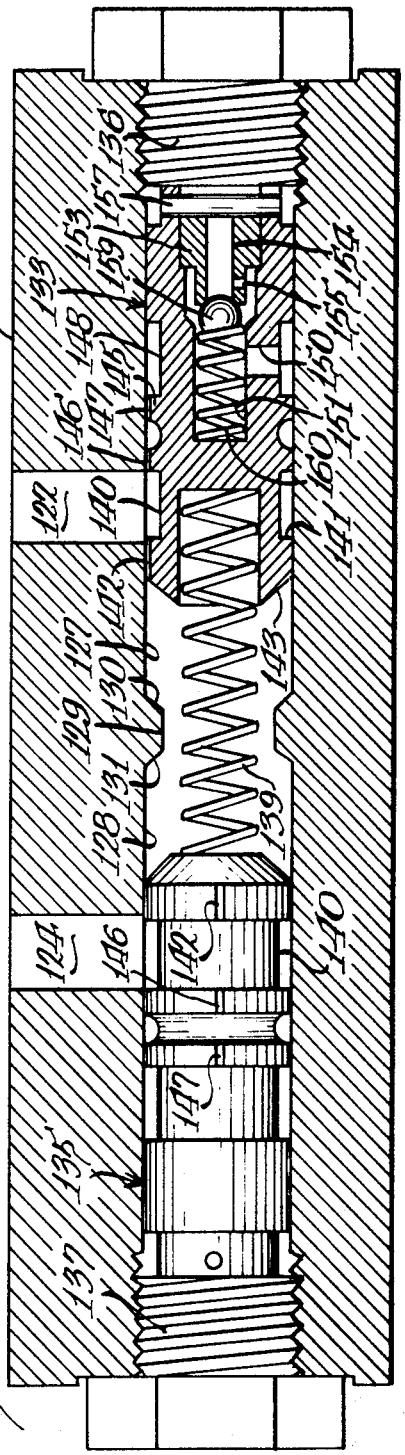

3,740,950

HYDROSTATIC TRANSMISSION WITH ACCELERATION CONTROL

BACKGROUND OF THE INVENTION

Hydrostatic transmissions have attained considerable commercial significance as drives for propelling various forms of vehicles, such as garden tractors, all-terrain vehicles and lift trucks. The present invention contemplates a transmission adapted for use in propelling such vehicles. Transmissions of this type generally include a multiple piston variable displacement pump connected in closed hydraulic circuit with a fixed or variable displacement motor. In a typical embodiment, the pump is connected to be driven by the vehicle prime mover and its displacement is variable in opposite directions from neutral. The motor is connected directly or through suitable gearing to the vehicle wheels or tracks. Acceleration and deceleration of the transmission are controlled by varying the displacement of the pump in one or both directions from neutral. The closed hydraulic circuit includes a first conduit connecting the pump outlet with the motor inlet and the second conduit connecting the motor outlet with the pump inlet. Either of these conduits may be the high pressure conduit depending upon the direction of displacement of the pump from neutral. In this manner, the motor may be rotated in opposite directions and the associated vehicle driven in either a forward or reverse direction.

While the hydraulic units embodied in such transmissions may be relatively small in some embodiments because of the relatively light loads contemplated, nevertheless they are relatively powerful to assure capacity for the work contemplated, and the transmission is capable of rapid acceleration in the absence of limiting controls. Since most of the vehicles have provision for transporting a riding operator, rapid acceleration or rapid deceleration may represent a hazard for the rider, tending to throw him off balance or even off the vehicle.

In some vehicles, such as lift trucks, which may be heavily loaded with weights approaching the weight of the vehicle in precariously balanced arrangements, it is desirable to provide a precise control of acceleration, and sometimes deceleration, in order not to disturb the load carried by the vehicle. In such vehicles there should be the capability of starts without preceptible jerks, the capacity for creeping at very slow and infinitely variable rates, and yet when under way in less delicate situations, the transmission should be capable of lively response.

In the past, prior art transmissions have included acceleration and/or deceleration controls in various forms. For example, U. S. Pat. No. 3,253,411 contains provision for varying the setting on a relief valve to increase gradually responsive to pressure increase in the main transmission conduit, in a manner to provide controlled acceleration. However, such control is embodied in the main high pressure relief valve for the circuit, whereas in some circumstances it is desirable to provide an acceleration control which is entirely separate from the main high pressure relief valve so that in event of any malfunction of one control, there would be no concomitant malfunction in the other.

In U. S. Pat. No. 3,359,727, an acceleration control is provided by means for varying the pressure in a control circuit for operating displacement varying means. However, such a control contemplates a separate displacement control circuit, whereas it is desirable in some situations to utilize an acceleration control functioning in the main working circuit because the displacement varying means may be operated by direct manual control without a separate control circuit.

In U. S. Pat. No. 3,555,817, a control is provided for varying the setting on a pilot valve for a relief valve responsive to the position of displacement varying means, but the control responds differently on deceleration and acceleration.

SUMMARY OF THE INVENTION

According to the present invention, an acceleration and deceleration control is provided which is separate and apart from the main high pressure relief valves for the working conduits connecting the pump and motor. Nevertheless, the improved control of the present invention functions directly in the working circuit between the pump and motor rather than in a control circuit. Additionally, the present control functions on acceleration and similarly on deceleration.

An acceleration control according to the present invention includes valve means providing a bypass passage between the pressure conduit and the return conduit in the working circuit including a valve member responsive to pressure buildup in the pressure conduit for closing the bypass passage, and yieldable means urging the valve member toward open position establishing the bypass passage.

Preferably, the valve member includes means providing a restricted passageway for supplying fluid under pressure from the pressure conduit to move the valve member to closed position, and a check valve in the valve member for bypassing the restricted passage on return movement of the valve member to open position when pressure drops in the pressure conduit.

In the preferred form of the invention illustrated herein, it includes a valve bore having a first port communicating with the pressure conduit between the pump and motor, and a second port communicating with the return conduit between the pump and motor, a first valve member in the valve bore communicating with the first port and a second valve member in the bore communicating with the second port, means providing a restricted bypass passage between the first and second ports through both valve members, spring means urging both valve members toward valve open position establishing the bypass passage, and means on each valve member providing a restricted passageway for supplying fluid under pressure from the associated port to move the valve member toward closed position.

DESCRIPTION OF THE DRAWINGS

FIG. 1 is a schematic illustration of a hydrostatic transmission including an acceleration control embodying the principles of the present invention; and FIG. 2 is an enlarged longitudinal sectional view through the acceleration and deceleration control valve shown in the FIG. 1.

DETAILED DESCRIPTION OF THE PREFERRED EMBODIMENT

Referring now to the drawings in more detail, a hydrostatic transmission according to the present invention includes an engine driven pump 14 and a motor 16 supplied with fluid under pressure from the pump. The pump and motor are hydraulically connected by conduits 18 and 20 to establish a closed transmission circuit for pumping fluid under pressure from the pump to the motor. The output of an engine (not shown) is transmitted to the pump through suitable shaft represented diagrammatically at 22. The output from the motor is transmitted to the driving wheels or tracks of a vehicle by means of a suitable shaft represented diagrammatically at 24.

Preferably, the pump and motor are of an axial piston type having rotatable cylinder blocks 14a and 16a, respectively, each with a plurality of cylinders in annular array and reciprocable pistons 14b and 16b, respectively, having ends reciprocating in the cylinders. The pump 14 has a variable angle reversible swash plate 26 engaged by projecting ends of pistons 14b for controlling the speed of the transmission as well as the direction thereof. As shown, the motor has a fixed displacement inclined cam 28 engaged by the pistons 16b, but the motor may have provision for varying displacement if desired.

For positioning the pump swash plate, a manual control is provided, herein shown as a handle 30 directly mounted on the variable swash plate 26, though other linkage may be utilized, if desired, between the handle and the swash plate. Normally, the handle is positioned as shown in FIG. 1 to dispose the pump swash plate in a position of minimum displacement so that there is no positive output from the pump. The handle may be manipulated to tilt the swash plate in either direction from neutral, and in this manner movement in opposite directions may be imparted to the motor and thus to the vehicle driven thereby.

A positive displacement gear-type replenishing pump is provided at 46, driven by suitable means from the engine. The replenishing pump communicates with a reservoir as at 48 through an intake conduit 50 and supplies replenishing fluid to the system through a conduit 52. A pair of spring-biased check valves 54 and 56 communicate with the conduit 52 and with the conduits 18 and 20, respectively, for supplying replenishing fluid to the low pressure side of the circuit through one check valve, while pressure in the high pressure conduit will maintain the other check valve closed. A spring-biased makeup relief valve 58 communicates with the conduit 52 and serves to relieve excess fluid.

The transmission includes high pressure relief valves 60 and 62 in communication with each of the main conduits by means of conduits 64 and 66, respectively. The valves serve to prevent excessive high pressure in either of the lines 18 and 20 by relieving the circuit of surge pressures which may occur in unusual circumstances, for example, when the vehicle encounters an obstruction to its movement. In response to such high pressure, the appropriate relief valve shifts to dump the excess oil to the low pressure side of the circuit. For example, when high pressure exists in line 18, then fluid through conduit 64 will cause valve 60 to shift to a position bypassing fluid to conduit 20 through the passage 66.

According to the present invention, in order to control acceleration and deceleration, a control 120 is connected between the pressure and return conduits 18 and 20 by means of passages as at 122 and 124. As shown in detail in FIG. 2, the control 120 includes an appropriate valve body 126 formed with a valve bore 127 communicating with passage 122 and an aligned valve bore 128 communicating with passage 124. Between the valve bores 127 and 128 there is an annular abutment 129 having opposed inclined end surfaces 130 and 131 for purposes of valve seats as will appear presently. The valve bore 127 contains a valve member 133, and the valve bore 128 contains a valve member 135. Access is provided to the valve bore 127 by means of a threaded closure plug 136, and access is provided to the valve bore 128 through a threaded closure plug 137. Between the valve members 133 and 135, a weak coiled compression spring 139 is positioned to act against both valve members, urging the latter apart respectively against the closure plugs 136 and 137.

The valve members 133 and 135 are similarly formed, and each includes an annular groove as at 140 communicating with the associated passage 122 or 124. Between the groove 140 and the end of the valve member there is an enlarged land as at 141 formed with a plurality of longitudinal slots as at 142 which function to communicate the passages 122 and 124 with each other when both valve members are positioned as illustrated in FIG. 2. At the end, the valve member is formed with an inclined end surface 143 adapted to engage the end surface as at 130 on the annular abutment 129, whereupon the longitudinal grooves 142 are obstructed to prevent communication between the passages 122 and 124. Preferably, the end surface 143 on the valve member 133 is tapered to make line contact with surface 130 at the inner edge of surface 130.

At the opposite side of the annular groove 140, the valve member is formed with one or more lands as at 145 provided with longitudinal slots as at 146 and 147 for communicating the annular groove 140 with an annular groove 148. The slots 146 and 147 with the annular groove 148 are provided for supplying fluid under pressure from the passage 122 to the remote end of the valve member for urging the valve member toward the abutment surface as at 130, against the bias of the spring 139. To this end, the annular groove 148 communicates with one or more radial ports as at 150 leading to an internal bore 151. Toward the end of the valve member, the bore 151 is enlarged to receive an annular fitting 153 having a central passage 154 and a restricted radial port 155 communicating the central passage 154 with the bore 151. As shown, the fitting 153 is retained in place in valve member 133 by a transverse pin as shown at 157 but the fitting may be threaded into the valve member if desired. In either event, the central passage 154 in the fitting 153 communicates with the end of the valve member 133. Adjacent the radial port 155, the end of the central passage 154 is closed by a ball check valve member 159 urged to the seated position illustrated in FIG. 2 by means of a coiled compression spring 160 in the valve bore 151.

The slots 142, 146 and 147 are progressively smaller so that initially when the valve member 133 is positioned as shown, the flow through slots 142 is greater than that through slots 146 and 147, and later when the valve member moves toward the left, the flow through 146 to conduit 20 is greater than flow through 147 to the back of the valve member.

In operation, when the valve members 133 and 135 are positioned as illustrated in FIG. 1, the longitudinal slots 142 provide for communication between the passages 122 and 124. Thus, when the pump is put into stroke and begins to deliver fluid under pressure through the conduit 18, for example, the conduits 18 and 20 are initially cross-connected through the passage 122, the slots 142, the bore 127, the bore 128 and the passage 124. Because of the cross-connection, the pressure in the passage 18 builds up rather slowly and limits the rate at which the vehicle may be accelerated. As the pressure of fluid in the conduit 18 increases, the pressure is ultimately communicated to the outer end of the valve member 133 through the slots 146, the annular groove 148, the radial port 150, the internal bore 151, the restricted port 155 and the central passage 154. Ultimately, the pressure behind the valve member becomes sufficient to move the valve member toward the left against the bias of the spring 139. When the end surface 143 on the valve member engages the valve seat 130, the longitudinal slots 142 are closed, blocking communication between the passage 122 and the passage 124. When the valve is closed as described, the pressure in the conduit 18 is then able to attain its maximum valve as limited by the pressure relief valve 60. In the absence of a pressure drop to an extremely low level, the valve will remain closed until there is a pressure reversal in conduits 18 and 20 as occurs on deceleration.

In event of deceleration, as occurs when the pump swash plate 26 is moved back toward the neutral central position, the pressure of fluid in the conduit 18 is reduced and the pressure acting behind the valve member 133 is reduced. At the same time, the inertia of the vehicle tends to drive the motor 16 as a pump, developing high pressure in the return conduit 20. The higher pressure in the conduit 20 acts through the passage 124 and the slots 142 to aid in returning the valve member 133 toward the position illustrated in FIG. 2. In order to facilitate rapid return movement of the valve member, the check valve 159 is adapted to open for purposes of bypassing the restricted orifice 155. In this manner, communication is promptly reestablished between the passage 124 and the passage 122 so that on initial deceleration, there is little resistance to the pumping action of the motor 16 and abrupt stopping cannot occur. If the speed of the vehicle is sufficient, the pressure of fluid in the passage 124 may ultimately act against the left end of the valve member 135 to move the latter toward the abutment surface 131. In this manner, the increased restricting effect of the valve member 135 is gradually applied for the purpose of gradually bringing the vehicle to a stop. If desired in some vehicles where the nature of the reverse operation permits, valve member 135 may be omitted and replaced by a plug with a fixed orifice limiting reverse acceleration.

I claim:

1. A hydrostatic transmission, comprising,
a. a pump,
b. a motor having an output shaft,
c. a first conduit connecting the pump outlet and the motor inlet,
d. a second conduit connecting the motor outlet and the pump inlet,
e. means for varying the output of the pump to cause operation of the output shaft, and
f. an acceleration control valve including: means providing a bypass passage between the first and second conduits,
a valve member responsive to pressure buildup in said first conduit for closing the bypass passage,
yieldable means urging the valve member toward open position establishing, said bypass passage,
means providing a restricted passageway for supplying fluid under pressure from the first conduit to move the valve member to closed position, and
check valve means for bypassing the restricted passageway on return movement of the valve member to open position when pressure drops in the first conduit.

2. A hydrostatic transmission, comprising,
a. a variable displacement pump,
b. a motor having an output shaft,
c. a first conduit connecting the pump outlet and the motor inlet,
d. a second conduit connecting the motor outlet and the pump inlet,
e. means for varying the displacement of the pump to cause operation of the output shaft, and
f. an acceleration control valve including: a valve bore having a first port communicating with the first conduit,
a second port communicating with the second conduit and an annular abutment providing a valve seat,
a valve member movable in the valve bore to a valve closed position engaging said abutment responsive to pressure buildup in said first conduit,
a longitudinal groove on the valve member providing restricted bypass communication between the first and second ports with the valve member in open position, and
yieldable means urging the valve member toward open position establishing said bypass communication.

3. A hydrostatic transmission, comprising,
a. a variable displacement pump,
b. a motor having an output shaft,
c. a first conduit connecting the pump outlet and the motor inlet,
d. a second conduit connecting the motor outlet and the pump inlet,
e. means for varying the displacement of the pump to cause operation of the output shaft, and
f. an acceleration control valve including: a first port communicating with said first conduit,
a second port communicating with said second conduit,
a valve member having means providing restricted bypass communication between the first and second ports with the valve member in open position,
yieldable means urging the valve member toward open position establishing said bypass communication,
means on the valve member providing a restricted passageway for supplying fluid under pressure from the first port to move the valve member to closed position, and
a check valve in the valve member for bypassing the restricted passageway on return movement of the valve member to open position when pressure drops in the first conduit.

4. A hydrostatic transmission, comprising,
a. a variable displacement pump,
b. a motor having an output shaft,
c. a first conduit connecting the pump outlet and the motor inlet, d. a second conduit connecting the motor outlet and the pump inlet, e. means for varying the displacement of the pump in opposite directions from neutral, and f. acceleration control valve means including, a first valve communicating with said first conduit, a second valve communicating with said second conduit, means providing a restricted bypass passage between the first and second conduits through both valves, each valve including a valve member normally biased to an open position establishing said bypass passage, and means for supplying fluid under pressure from each conduit to the associated valve for moving the valve member to a closed position blocking the bypass on increase of pressure in the associated conduit.

5. A hydrostatic transmission as defined in claim 4, including a valve bore having a first port communicating with said first conduit and said first valve member, and a second port communicating with said second conduit and said second valve member, and spring means acting between the valve members urging both toward valve open position.

6. A hydrostatic transmission as defined in claim 4, including means on each valve member providing a restricted passageway for supplying fluid under pressure from the associated conduit to move the valve member to closed position.

7. A hydrostatic transmission as defined in claim 6, including a check valve in each valve member for bypassing the restricted passageway on return movement of the valve member to open position on pressure drop in the associated conduit, and spring means urging the check valve to closed position.

8. A hydrostatic transmission, comprising a. a variable displacement pump, b. a motor having an output shaft, c. a first conduit connecting the pump outlet and the motor inlet, d. a second conduit connecting the motor outlet and the pump inlet, e. means for varying the displacement of the pump in opposite directions from neutral, and f. acceleration and deceleration control valve means including a valve bore having a first port communicating with the first conduit and a second port communicating with the second conduit, a first valve member in the bore communicating with the first port and a second valve member in the bore communicating with the second port, means providing a restricted bypass passage between the first and second ports through both valve members, spring means urging both valve members toward valve open position establishing said bypass passage, means on each valve member providing a restricted passageway for supplying fluid under pressure from the associated port to move the valve member toward a closed position blocking the bypass passage on pressure increase in the associated port, and a check valve in each valve member for bypassing the restricted passageway on return movement of the valve member to open position responsive to pressure drop in the associated conduit.

* * * * *